June 10, 1952          D. E. JONES          2,600,167

FERTILIZER AND SEED BROADCASTING APPARATUS

Filed May 8, 1947          2 SHEETS—SHEET 1

Inventor,
Denzil E. Jones,
By Frank S. Appleman,
Attorney,

Inventor,
Denzil E. Jones,
By Frank L. Appleman,
Attorney.

Patented June 10, 1952

2,600,167

UNITED STATES PATENT OFFICE 2,600,167

FERTILIZER AND SEED BROADCASTING APPARATUS

Denzil E. Jones, El Monte, Calif.

Application May 8, 1947, Serial No. 746,686

2 Claims. (Cl. 275—8)

The present invention relates to broadcasting apparatus and more particularly it has reference to a machine which may be readily and easily attached to a power driven vehicle, such as a tractor, and operated from the power take-off of the vehicle. While my invention is especially efficacious for broadcasting or distributing those types of fertilizers and seeds which are disposed on the top of the soil, namely, clovers, winter peas, vetch, oats and other species of small grain, it is obvious that it may be used to distribute other finely divided substances.

Of course, I am cognizant of the fact that numerous machines have heretofore been designed for broadcasting finely divided materials, but these machines have not been entirely satisfactory. For instance, the majority of these prior devices have been quite complex in structural detail with the attendant high cost of manufacture. In addition, I know of no distributors which will operate while the machine is stationary, and also none of the machines have means for the quick control of the quantity of material which is broadcast at any given time.

One important object of this invention is to overcome the above and other disadvantageous features now present in the art.

Another object of my invention is to provide a broadcasting attachment for power driven vehicles which may be operated by the power take-off of the vehicle.

Still another object of my invention is to provide a broadcasting machine which comprises relatively few essential working parts and which can be cheaply and easily manufactured.

Yet a further object of this invention is to provide a broadcasting machine which may be readily attached to a tractor or other power driven vehicle and which will not interfere with the normal operation of the vehicle.

And yet another object of my invention is to provide a broadcasting machine having means whereby the quantity of material distributed at any given time may be quickly controlled.

Other objects and advantages of the invention will be apparent to those skilled in the art upon a study of the specification and annexed claims.

In the drawings in which like numerals indicate the same or similar parts:

Figure 1:
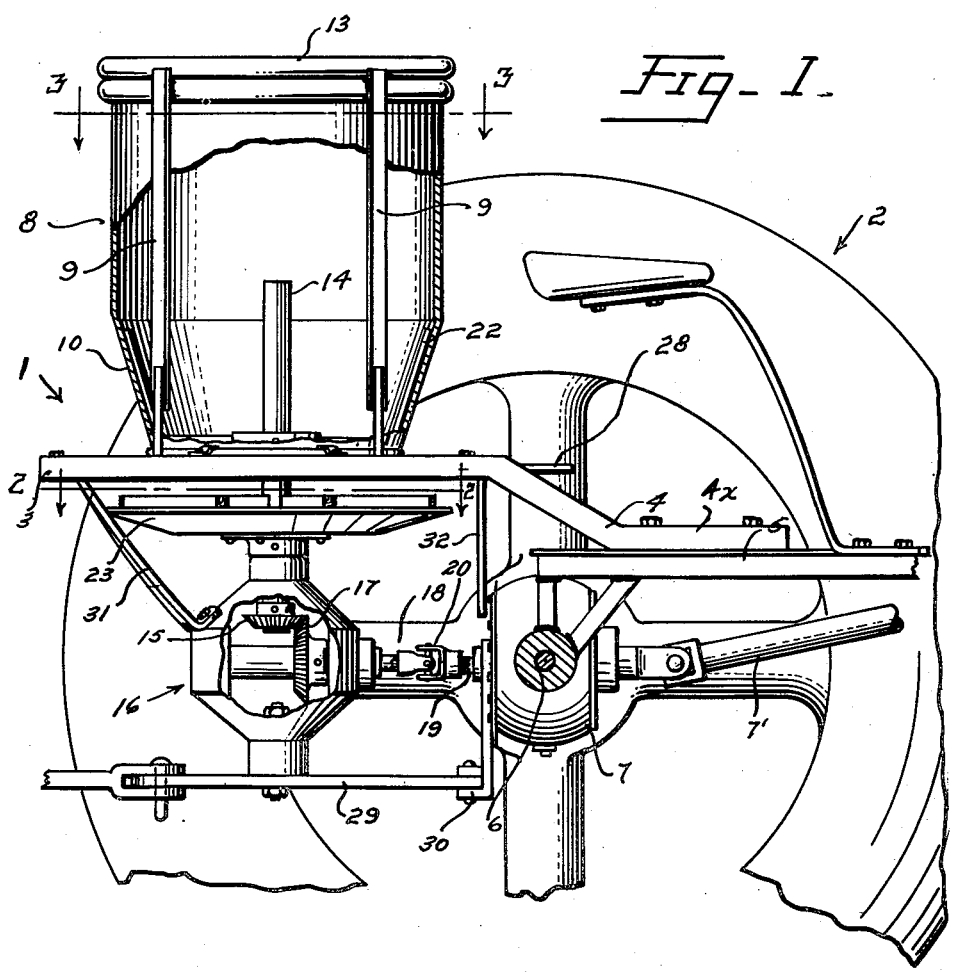
Figure 1 illustrates a side elevational view, partly in section, of my broadcasting machine attached to a tractor.
Figure 2:
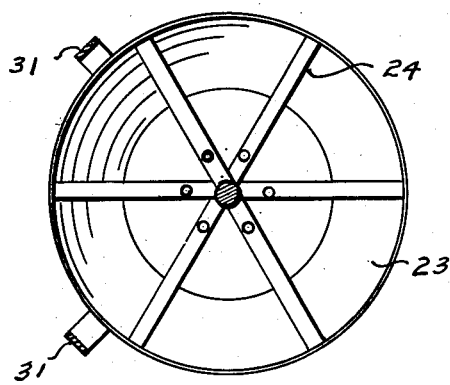
Figure 2 illustrates a sectional view taken along the line 2—2 of Figure 1, looking in the direction of the arrows.
Figure 6:
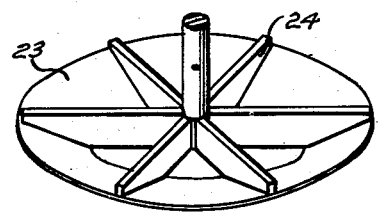
Figure 6 illustrates a perspective view of the distributor plate or disk.

In the form of invention shown, I provide a frame or supporting structure 1 which is suitably attached to the rear of a tractor or other power driven vehicle 2 of conventional construction. The frame 1 includes a pair of parallel horizontally disposed angle irons 3 having downward inclined ends 4, having extensions 4x parallel to the portions 3 which are bolted to platform of tractor 5, thus rendering quick detachable apparatus.

A hopper 8 for containing the material to be distributed is mounted on the angle irons 3 and held in proper position by straps 9, which are affixed to the hopper and irons, respectively, in any convenient manner. The hopper tapers downwardly as shown at 10, and lower wall 11 is provided with a pair of arcuate discharge openings 12. The open upper end may be closed by means of a cover 13.

A vertical shaft 14 extends into the hopper 8 and the lower end terminates in a bevel gear 15, forming a gear reduction by meshing with gear 17 on drive shaft 18. The male splined drive shaft 18 is coupled to male spline power take-off shaft 19 by female splined sleeve 20 or female spline universal sleeve 20. Manifestly, rotation of the shaft 19 will likewise rotate the shaft 14 through reduction gears 15 and 17 whenever the power take-off is in gear and the engine running.

A hub 21 is pinned to the shaft 14 within the hopper adjacent the lower wall 11 and carries agitating blades 22 for moving the material downwardly at a uniform rate and for preventing clogging of the discharge openings 12 during operation. A distributor plate or disk 23 having radial vanes 24 for broadcasting the material delivered from the hopper is also secured to the shaft 14 beneath the hopper as shown in Figure 1.

Figure 3:
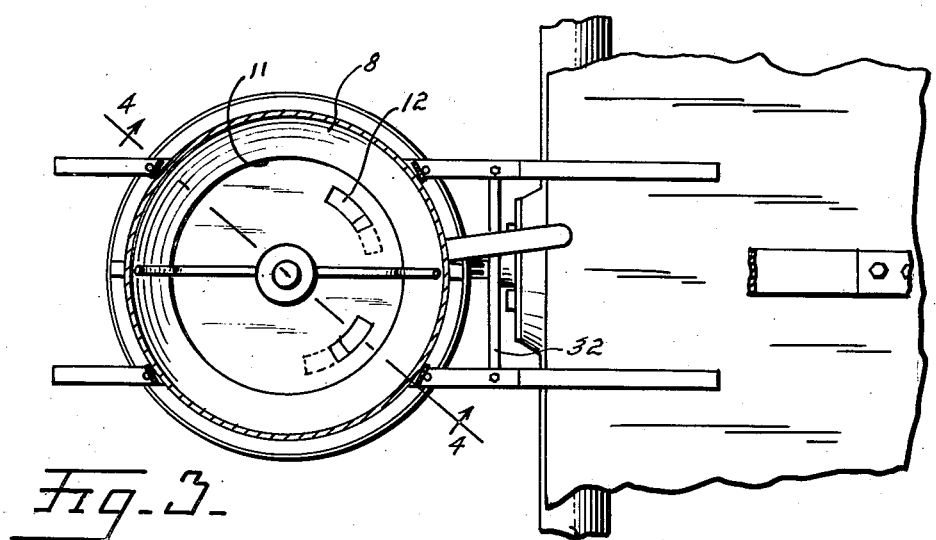
Figure 3 illustrates a sectional view taken along the line 3—3 of Figure 1 looking in the direction of the arrows.
Figure 4:
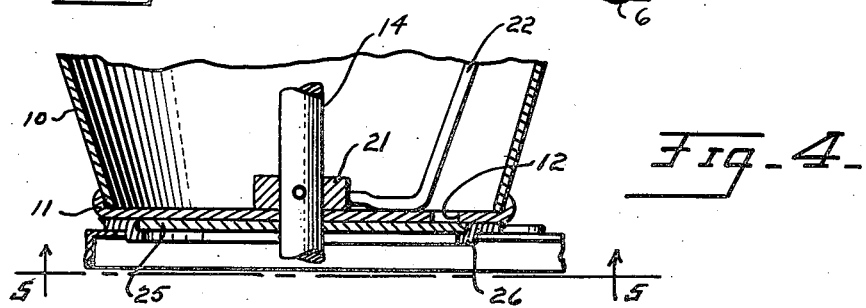
Figure 4 illustrates a sectional view taken along the line 4—4 of Figure 3 looking in the direction of the arrows.
Figure 5:
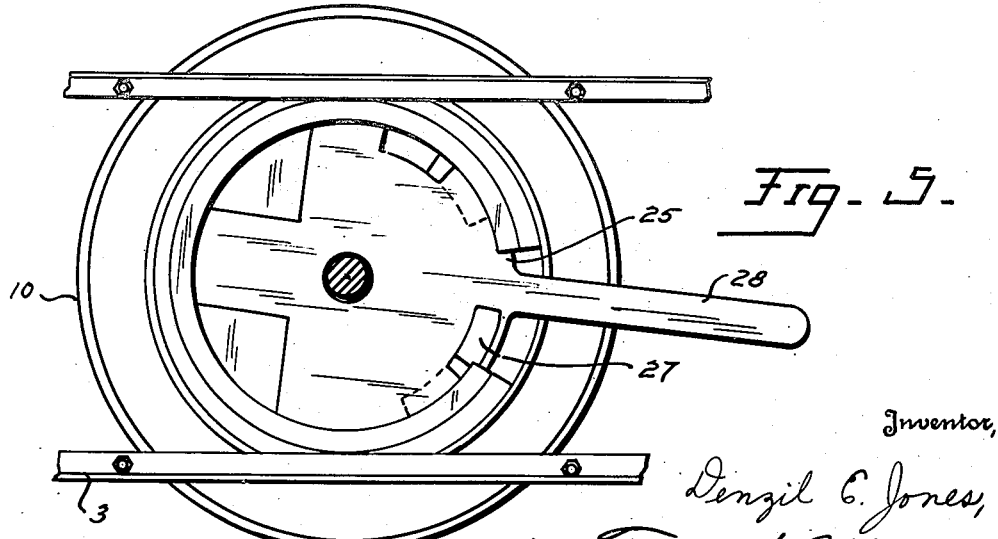
Figure 5 illustrates a sectional view taken along the line 5—5 of Figure 4 looking in the direction of the arrows.

A rotatable valve plate 25 is positioned immediately below the hopper 8 for controlling the flow of material through the discharge openings 12 in the lower wall 11 onto the distributor disk 23. The valve 25 is mounted for rotary movement relative to the hopper by means of straps 26 which are attached to the wall 11 in any suitable manner, such as welding. Referring to Figure 3, it can be seen that the valve plate is provided with a pair of arcuate slots 27 which are adapted to register with the discharge openings 12 for enabling the seed or other material to pass from the hopper to the distributor plate or disk 23. An operating handle 28 extends from and is preferably integrally formed with the plate and is of sufficient length to be readily operated by the driver of the tractor. By manipulation of the handle 28, the valve 25 may be rotated with respect to the hopper and the size of the discharge openings 12 may be varied to suit any situation which may arise.

To further support the frame 1, the lower end of the reduction gear housing 16 may be attached to a draw bar or the like 29 which, in turn, is carried by the tractor, as shown at 30. In addition, the frame may be strengthened by braces 31 which are suitably bolted to the gear housing and to the angle irons 3. To prevent the distributor plate 23 from throwing the material onto the tractor, I mount a deflector 32 on the frame 1 adjacent the inner ends of the angle irons 3.

To put the machine in operation, the power plant of the tractor is started and the power take-off gear is engaged. The power take-off gear and shaft 19 are an integral part of the tractor. When the power take-off gear is engaged, it rotates shaft 19, which in turn rotates shaft 18, by virtue of sleeve 20, which rotates shaft 14 through gears 15 and 17. Simultaneously, the shaft 14 will rotate and with it the agitating blades 22 and the distributor blades 23. The operator rotates the valve plate 25 by means of handle 28 to effect registry of the openings 12 and slots 27 for discharging the material onto the rotating plate 23 whereupon the material will be broadcast on the soil. By operating the device from the power take-off from the tractor, I am able to distribute the material even though the tractor is not in motion, which is a distinct advantage over the devices now in use. In other words, my invention can be operated so long as the tractor engine is running, whether the tractor is moving or standing still, and the power take-off is in gear. To broadcast material, valve plate 25 must be in a position to aline opening 12 and slot 27 to allow material to pass down onto plate 23. No matter whether tractor is moving or standing, to stop distribution of material, close openings 12 and slots 27 by moving handle 28. Whether tractor is moving or standing or whether handle 28 is opened or closed, to stop operation of distributor, disengage power take-off gear.

From the foregoing, it will be appreciated that I have provided an attachment for broadcasting materials which may be easily operated from the power take-off of a vehicle such as a tractor. Furthermore, my device is simple in construction and operation and may be readily attached to conventional power driven vehicles, and it is seen that the angle of the inner portion 4 is such as to raise the angle of the irons 3 a substantial distance above the axle 6 and gear box 7 of the tractor which is connected by the shaft 7' to the engine of the tractor.

I claim:

1. In a machine for broadcasting finely divided materials of the type operated by a tractor having a power take-off shaft, a frame attached to the rear of the tractor, a supply hopper supported by the frame and having a lower wall provided with a pair of spaced apart discharge slots therein, a valve plate rotatably supported by the hopper beneath the lower wall thereof and having a pair of spaced apart openings adapted to be brought into registry with the aforesaid slots to control the amount of material discharged from the hopper, a handle on the valve plate extending to a point adjacent the operator of the tractor to permit rotation of the said valve plate, a vertical shaft extending into the hopper, the said spaced apart slots being located forwardly of the said vertical shaft, vanes secured to the shaft immediately above the lower wall of the hopper, each vane including a horizontal portion overlying the lower wall of the hopper, and an angular portion extending upwardly from the free end of the horizontal portion in parallel relation to the hopper wall to prevent clogging of the openings and move the material downwardly to the openings, a concave distribution disc having radially extending blades mounted on said shaft below the hopper to receive the material from the hopper and elevate and distribute the material in a half circle rearwardly of the tractor, a bevel gear on the said shaft at the lower end thereof, a driven shaft coupled with the power take-off shaft and a bevel gear on the free end of the said driven shaft meshing with the bevel gear on the said vertical shaft whereby rotation of the driven shaft will effect rotation of the vertical shaft and the concave distribution disc.

2. In a machine for broadcasting finely divided materials of the type operated by a tractor having a power take-off shaft, a frame supported by the rear of the tractor, a supply hopper mounted on the frame and having a lower wall provided with a pair of spaced apart arcuate slots therein, a valve plate rotatably supported by the hopper beneath the lower wall thereof and having a pair of spaced apart arcuate openings adapted to be brought into registry with the aforesaid slots to control the quantity discharged from the hopper, a handle on the valve plate extending to a point adjacent to the operator of the tractor to permit rotation of the said valve plate, a vertical shaft extending into the hopper, the said spaced apart arcuate slots being located forwardly of and concentric to the vertical shaft, vanes secured to the shaft immediately above the lower wall of the hopper, each vane including a horizontal portion and an angular portion extending upwardly from the horizontal portion to prevent clogging of the slots and to move the material downwardly to the said slots, a concave disc on the vertical shaft below the hopper and having a plurality of radially extending blades thereon, the disc being adapted to receive the material from the hopper and elevate and distribute the material in a half circle rearwardly of the tractor, a bevel gear on said vertical shaft at the lower end thereof, a driven shaft coupled with the power take-off shaft and a bevel gear on the free end of the said driven shaft meshing with the bevel gear on the vertical shaft whereby rotation of the driven shaft will effect rotation of the vertical shaft and the concave disc.

DENZIL E. JONES.

REFERENCES CITED

The following references are of record in the file of this patent:

UNITED STATES PATENTS

| Number | Name | Date |
| --- | --- | --- |
| 683,545 | Baker | Oct. 1, 1901 |
| 1,233,167 | Belding | July 10, 1917 |
| 1,625,353 | Dugan | Apr. 19, 1927 |
| 2,293,977 | Hoffstetter | Aug. 25, 1942 |
| 2,302,413 | Blackwelder et al. | Nov. 17, 1942 |
| 2,327,266 | Hoffstetter | Aug. 17, 1943 |
| 2,334,376 | Bauer | Nov. 16, 1943 |
| 2,463,855 | Crawford | Mar. 8, 1949 |
| 2,489,171 | Balduf | Nov. 22, 1949 |
| 2,519,243 | Gjertson | Aug. 15, 1950 |